United States Patent [19]

Holmes et al.

[11] Patent Number: 4,612,104
[45] Date of Patent: Sep. 16, 1986

[54] ELECTROCHEMICAL CELL

[75] Inventors: John P. Holmes, Newcastle upon Tyne; Roderick W. Froud, Chester-le-Street, both of United Kingdom

[73] Assignee: Cogent Ltd., London, England

[21] Appl. No.: 652,079

[22] Filed: Sep. 20, 1984

[30] Foreign Application Priority Data

Sep. 29, 1983 [GB] United Kingdom ............... 8326170

[51] Int. Cl.[4] .......................... C25B 9/00; C25B 15/08
[52] U.S. Cl. .................................... 204/272; 204/275
[58] Field of Search ............................... 204/272, 275

[56] References Cited

U.S. PATENT DOCUMENTS

| | | | |
|---|---|---|---|
| 3,706,646 | 12/1972 | Gibson, Jr. et al. | 204/272 X |
| 3,718,540 | 2/1973 | Bailey | 204/272 |
| 4,026,785 | 5/1977 | Ford | 204/286 |
| 4,053,377 | 10/1977 | Schlain et al. | 204/275 X |

FOREIGN PATENT DOCUMENTS

| | | | |
|---|---|---|---|
| 2208950 | 9/1972 | Fed. Rep. of Germany | 204/272 |
| 741139 | 11/1955 | United Kingdom | 204/272 |

Primary Examiner—Donald R. Valentine
Attorney, Agent, or Firm—Rosen, Dainow & Jacobs

[57] ABSTRACT

An electrochemical cell has an annular flow passage for electrolyte solution. The cell is designed such that, in an intermediate zone, the passage is of constant cross-section (to achieve high electrolytic activity) and, in end zones, the passage progressively increases in cross-section to a maximum value (to lower the current density in regions in which unwanted deposition of salts may preferentially occur). The cross-sectional shape of the passage along its length also assists in reducing turbulence in the flow thereby reducing the rate of deposition of salts. Owing to the low rate of deposition, it is possible to maintain the electrodes relatively clean by current reversal at relatively infrequent intervals. That enables the cell to be used for longer periods between cleaning operations.

6 Claims, 2 Drawing Figures

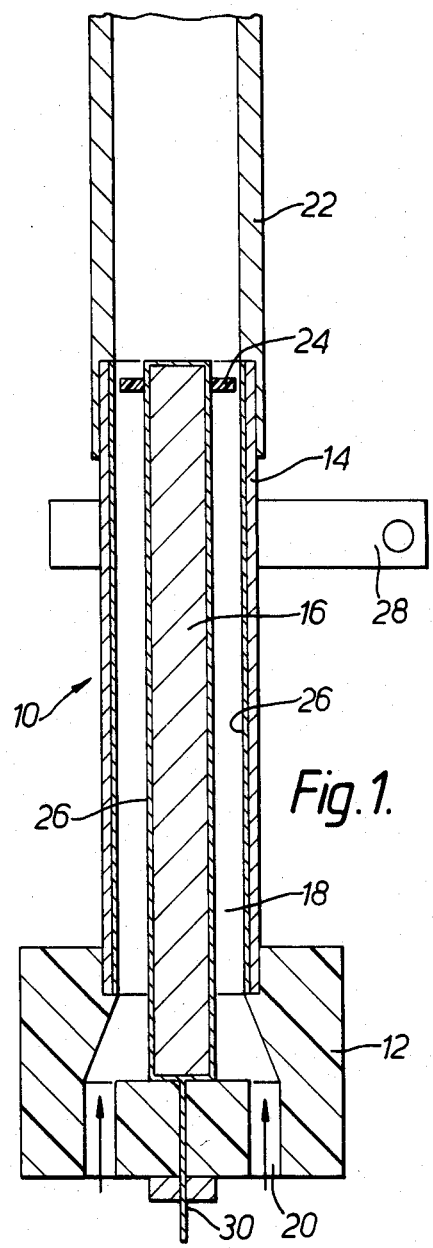
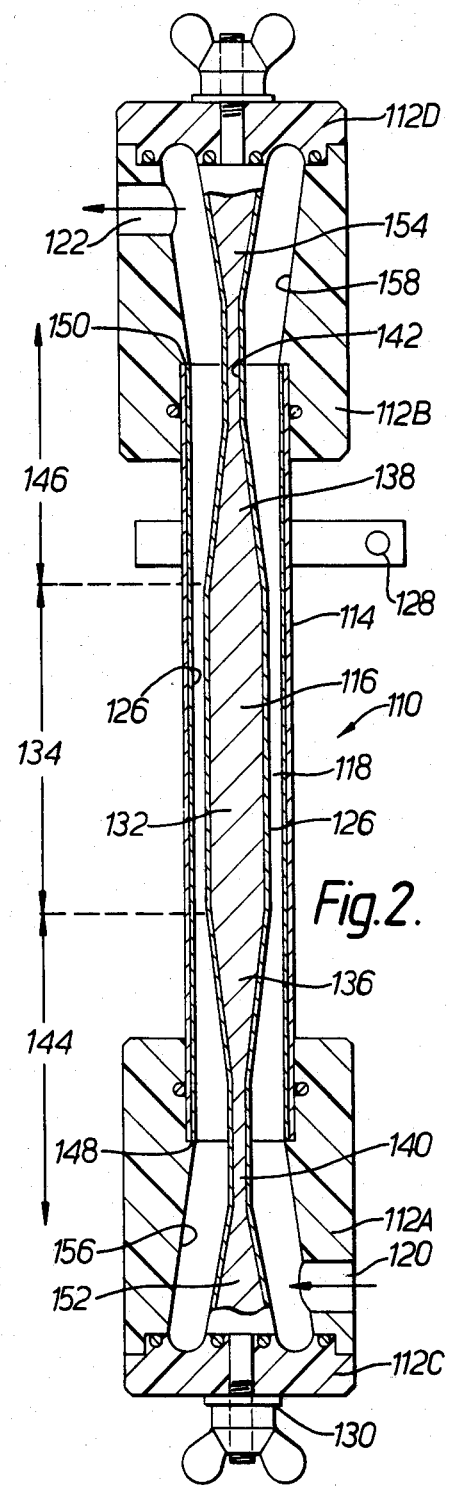

ELECTROCHEMICAL CELL

BACKGROUND OF THE INVENTION

This invention relates to an electrochemical cell of the type having a tubular outer electrode surrounding an inner electrode to define therewith an annular passage through which electrolyte solution can be passed.

Electrochemical cells of this type have electrodes which define a passage having a constant cross section over the whole of the length of the passage. The flow of electrolyte through the passage, particularly adjacent to the ends of the electrodes, is turbulent.

Some applications of such cells involve the use of aqueous electrolyte solutions, for example sodium chloride solution for the production of sodium hypochlorite for water purification. In many instances, such solutions contain calcium ions, particularly in areas in which the water is hard, which results in the deposition of calcium salts on the electrodes. The deposition of calcium salts occurs preferentially in the regions in which turbulent flow occurs. The deposition of calcium salts results from an electrochemical process involving the formation of calcium hydroxide at the electrode which forms the cathode of the cell.

Some deposition of insoluble calcium carbonate also occurs thoughout the whole of the cell by the decomposition of soluble calcium bicarbonate and by the combination of calcium hydroxide with atmospheric carbon dioxide.

Such cells can become choked by the deposited salts in a relatively short time, for example within a few weeks or even less in areas in which the water is very hard.

The rate at which the deposition of the calcium salts occurs can be minimized by the use of additives to the solution. However, when the treated water is intended for human consumption or use, the presence of the additives is undesirable and may not be permitted.

Alternatively, the rate of build-up of the deposited salts can be minimized by reversing the electrical current passing through the cells so that gas generated at the anode (previously the cathode) results in the deposited salts being flushed away. However, to be effective such current reversal has to occur say every 10 to 15 minutes. It has been found that current reversal has a detrimental effect on the thin platinum coating of the electrodes and that, consequently, such a high frequency of current reversal severely limits the life of the electrodes, for example, about 6 months average for electrodes having a 7.5-micron-thick platinum coating.

SUMMARY OF THE INVENTION

According to the present invention, an electrochemical cell has wall means defining an annular flow passage for electrolyte solution and an inlet and and an outlet from said annular passage at opposite ends of said cell, said wall means being adapted to induce non-turbulent flow through said annular passage and comprising a tubular outer electrode and an inner electrode supported within said outer electrode, said annular passage being substantially free of turbulent-flow-inducing features, the electrodes together defining an intermediate zone, in which said annular passage is of constant cross section and end zones in which said annular passage progressively increases in cross section to a maximum value thereof in a direction away from said intermediate zone and towards said inlet and said outlet, respectively, whereby the transverse separation of said electrodes in said end zones exceeds the transverse separation of said electrodes in said intermediate zone.

In the present invention, the effect of turbulence at the ends of the electrodes is less serious because the current density within the end zones, in which the electrodes are more widely spaced than in the intermediate zone, is lower than in the intermediate zone and, consequently, the deposition of salts is less likely to occur. Moreover, when deposition does occur, it occurs relatively slowly and allows the frequency of current reversal to be decreased thereby extending the life of the cell. Additionally, the deposition occurs where the electrode separation is relatively large and, consequently, any permanent depositions have little effect on the electrolyte flow rate and the requirement to clean the electrodes frequently is reduced. Furthermore, because the cross section of the annular passage changes progressivley, turbulence in the flow of electrolyte through the annular passage is minimized thereby further reducing the likelihood of deposition of salts on the electrodes.

Preferably, the transverse separation of the electrodes is at a maximum adjacent the ends of at least one of the electrodes.

Preferably, the inner electrode is longer than the outer electrode and projects beyond both ends of the outer electrode.

Preferably, the wall means adjacent the inlet and outlet has complementary frustoconical sections whereby the mean radius of the annular passage progressively decreases towards the intermediate zone.

BRIEF DESCRIPTION OF THE DRAWINGS

An electrochemical cell will now be described to illustrate the invention by way of example only with reference to FIG. 2 of the accompanying drawings, in which:

FIG. 1 is a longitudinal cross section through a prior art electrochemical cell; and FIG. 2 is a longitudinal cross section through an electrochemical cell constructed in accordance with the present invention.

DESCRIPTION OF THE DRAWINGS

Both cells are for the production of sodium hypochlorite solution from sodium chloride solution, the sodium hypochlorite being usable to purify water for human use and consumption, for example.

Referring to FIG. 1, the cell 10 has a plastic support block 12 supporting at lower ends a hollow cylindrical outer electrode 14 in spaced relationship with a solid cylindrical inner electrode 16, the inner and outer walls of the electrodes 14 and 16, respectively, defining an annular flow passage 18 for electrolyte solution. The block 12 has inlet passages 20 for introducing electrolyte solution into the passage 18. The upper end of the outer electrode 14 carries an outlet tube 22. The upper end of the inner electrode 16 has plastic spacers 24 mounted thereon to maintain the concentricity of the electrodes 14 and 16.

The electrodes 14 and 16 are each made of titanium which has a platinum coating 26. Typically, the difference in the radii of the inner and outer walls of the electrodes 14 and 16, respectively, is 1 mm. The electrodes 14 and 16 can be connected to an electricity supply at 28 and 30, respectively.

In use of such cells 10, severe turbulence is generated as the electrolyte solution enters the cell 10 and this turbulence extends into the passage 18. Local flow discontinuities also arise at both ends of each of the electrodes 14, 16 and at the plastic spacers 24. Electrolyte solution thus flows turbulently in a region of high current density which results in a high rate of deposition of calcium salts on the electrodes 14, 16 which can quickly block the passage 18. Furthermore, the relatively high frequency of current reversal needed to minimize deposition would result in rapid damage to the platinum coatings 26 of the electrodes 14, 16.

Referring to FIG. 2, the cell 110 has lower and upper hollow cylindrical plastic support members 112A and 112B between which are mounted in spaced relationship a hollow cylindrical outer electrode 114 and a solid inner electrode 116. The inner electrode 116 is secured at its ends by respective plastic caps 112C and 112D which in turn are secured to the members 112A and 112B, respectively. The walls of the members 112A, 112B, the caps 112C, 112D and the electrodes 114, 116 define an annular flow passage 118 for electrolyte solution. The members 112A and 112B have an inlet 120 and an outlet 122, respectively, for introducing and removing electrolyte solution from the passage 118.

The electrodes 114 and 116 are each made of titanium which has a platinum coating 126, typically 2.5 to 5 microns thick. The electrodes 114 and 116 can be connected to an electricity supply at 128 and 130, respectively.

The outer electrode 114 is cylindrical.

The inner electrode 116 has a cylindrical center section 132 which together with the complementary portion of the outer electrode 114 define an intermediate zone 134 in which the annular passage 118 has a constant cross section and in which the transverse separation of the electrodes 114 and 116 is at its smallest value, typically 3 mm. Thus, in the intermediate zone 134 the current density is at the highest value within the cell and the electrolytic activity is also at a maximum.

The inner electrode 116 has frustoconically shaped portions 136, 138 adjacent the center section 132 thereof followed by cylindrical portions 140, 142, so that in end zones 144, 146, respectivey, the annular passage 18 progressively increases in cross section to a maximum value, the transverse separation of the electrodes 114 and 116 being at its greatest, typically 10 mm.

The inner electrode 116 is longer than the outer electrode 114. The ends 148, 150 of the outer electrode 114 are located substantially halfway along the cylindrical portions 140, 142 of the inner electrode 116.

The end portions 152, 154 of the inner electrode 114 are of a frustoconical shape complementary to the frustoconically shaped sections 156, 158, respectively, of the members 112A and 112B. Thus, the mean radius of the annular passage 118 progressively decreases towards the intermediate zone 134.

In use, electrolyte solution is fed into the cell 110 through the inlet 120 and into the annular passage 118. Although there is some turbulence of the flow adjacent the inlet 120, that turbulence progressively decreases as the solution passes through the end zone 144 of the cell 110. However, as the outer electrode 114 does not extend to the inlet 120, the electric field adjacent the inlet 120 is very low or zero and there is substantially no deposition of calcium salts though electrolytic action in that region. There may be some non-electrolytic deposition of calcium carbonate but as the passage 118 is relatively wide, the deposition does not affect the flow rate through the cell 110 during the interval between cleanings.

By the time the electrolyte solution encounters the local flow discontinuity caused by the end 148 of the outer electrode 114, the flow is substantially laminar. However, since the transverse separation of the electrodes 114, 116 is at a maximum, the current density is low and turbulence is minimal, the rate of deposition is minimal.

Additionally, any permanent deposition of salts has a minimal affect on the working of the cell 110 between cleaning operations owing to the large transverse separation of the electrodes 114, 116 in that zone.

In the intermediate zone 134 of the cell 110, although the current density is relatively high, the flow is substantially laminar and the rate of deposition of calcium salts is minimal. Thus, the deposition of calcium salts can be substantially controlled using current reversal as it is necessary to reverse the current only every one or two hours, for example. Such a frequency of current reversal enables the electrodes to be used for a practicable period, for example in excess of one year, before being replaced.

Additionally, there are no local flow discontinuities to cause preferential deposition of salts.

As the electrolyte solution passes into the end zone 146 of the cell 110, the flow is still laminar and deposition is minimal.

The annular passage 118 does not contain any local flow discontinuities of the type represented by the spacers 24 in the cell 10 shown in FIG. 1.

The cell 110 shown in FIG. 2 is a preferred form of cell. However, it will be apparent that modifications are possible within the scope of the invention. For example, the inlet and outlet ends of the cell need not be substantially identical; the outer electrode may be the same length as or longer than the inner electrode; the inner electrode may be cylindrical, the inner wall of the outer electrode being shaped to achieve the required geometry of annular flow passage.

What we claim is:

1. An electrochemical cell having wall means defining an annular flow passage for electrolyte solution and an inlet to and an outlet from said annular passage at opposite ends of said cell, said wall means being adapted to induce non-turbulent flow through said annular passage and comprising a tubular outer electrode and an inner electrode supported within said outer electrode, said annular passage being substantially free of turbulent-flow-inducing features, said electrodes together defining an intermediate zone in which said annular passage is of constant cross section and end zones in which said annular passage progressively increases in cross section to a maximum value thereof in a direction away from said intermediate zone and towards said inlet and said outlet, respectively, whereby the transverse separation of said electrodes in said end zones exceeds the transverse separation of said electrodes in said intermediate zone.

2. An electrochemical cell according to claim 1, in which the transverse separation of said electrodes is at a maximum adjacent said ends of at least one of said electrodes.

3. An electrochemical cell according to claim 1, in which said inner electrode is longer than said outer electrode and projects beyond both ends of said outer electrode.

4. An electrochemical cell according to claim 3, in which said outer electrode is cylindrical and in which said inner electrode has a cylindrical center section having at each end a frustoconical section followed by a cylindrical section of smaller diameter than said center section.

5. An electrochemical cell according to any one of claims 1, 2, 3 or 4, in which said wall means adjacent said inlet and said outlet has complementary frustoconical sections whereby the mean radius of said annular passage progressively decreases towards said intermediate zone.

6. An electrochemical cell according to claim 1, wherein said cell has a longitudinal axis between said opposite ends of said cell, and said inner electrode is supported within said outer electrode only along said longitudinal axis of said cell.

* * * * *